United States Patent [19]

Spinosa et al.

[11] Patent Number: 5,447,891
[45] Date of Patent: Sep. 5, 1995

[54] LEAD-FREE GLAZE OR ENAMEL FOR USE ON CERAMIC BODIES

[75] Inventors: Emilio D. Spinosa, Richfield, Ohio; Kevin J. Davies, Staffs, England

[73] Assignee: Ferro Corporation, Cleveland, Ohio

[21] Appl. No.: 128,905

[22] Filed: Sep. 29, 1993

[51] Int. Cl.⁶ .................. C03C 8/02; C03C 8/04; C03C 8/14
[52] U.S. Cl. ........................ 501/16; 501/17; 501/21; 501/26; 501/67
[58] Field of Search ............... 501/16, 17, 21, 26, 501/67

[56] References Cited

U.S. PATENT DOCUMENTS

| | | | |
|---|---|---|---|
| 2,063,252 | 12/1936 | Kinzie | 501/26 X |
| 2,278,867 | 4/1942 | Detrup | 501/67 X |
| 2,753,271 | 7/1956 | Treptow | 501/17 X |
| 3,784,384 | 1/1974 | Webb | 501/21 |
| 4,282,035 | 8/1981 | Nigrin | 106/48 |
| 4,340,645 | 7/1982 | O'Conor | 428/428 |
| 4,430,438 | 2/1984 | Krist et al. | 501/17 |
| 4,446,241 | 5/1984 | Francel et al. | 501/14 |
| 4,590,171 | 5/1986 | Nigrin | 501/25 |
| 4,624,934 | 11/1986 | Kokubu et al. | 501/17 |
| 4,814,298 | 3/1989 | Nelson et al. | 501/17 |
| 4,839,313 | 6/1989 | Kondo et al. | 501/14 |
| 5,017,521 | 5/1991 | Yale et al. | 501/64 |
| 5,264,398 | 11/1993 | Thometzek et al. | 501/21 |
| 5,268,335 | 12/1993 | Kerko et al. | 501/66 |
| 5,308,803 | 5/1994 | Clifford et al. | 501/17 |
| 5,348,915 | 9/1994 | Thomtezek et al. | 501/24 |

FOREIGN PATENT DOCUMENTS

| | | | |
|---|---|---|---|
| 0551953 | 1/1958 | Canada | 501/26 |
| 0267154A1 | 11/1988 | European Pat. Off. . | |
| 0452065A1 | 10/1991 | European Pat. Off. . | |
| 0509792A2 | 10/1992 | European Pat. Off. . | |
| 0527402A1 | 2/1993 | European Pat. Off. . | |
| 0208149 | 12/1983 | Japan | 501/21 |
| 2250740 | 6/1992 | United Kingdom . | |
| 0658098 | 4/1979 | U.S.S.R. | 501/26 |

*Primary Examiner*—Mark L. Bell
*Assistant Examiner*—David R. Sample
*Attorney, Agent, or Firm*—Rankin, Hill, Lewis & Clark

[57] ABSTRACT

The invention concerns a lead-free glaze or enamel for use on ceramic bodies such as bone china. In one embodiment the glaze or enamel includes a hard glass frit which comprises by weight percent from about 45% to about 70% $SiO_2$, from about 4% to about 15% $B_2O_3$, from about 4% to about 17% $Al_2O_3$, from about 1% to about 9% $Na_2O$, from about 1% to about 9% $K_2O$, from about 0.2% to about 5% $Li_2O$, from about 0.4% to about 12% CaO, from about 0.1% to about 7% $ZrO_2$, up to about 3% ZnO, up to about 2% $WO_3$, up to about 2% $Bi_2O_3$, and up to about 2% $MoO_3$.

18 Claims, No Drawings ptions served to lower the fusing point of the frit and to render an acid/alkali resistant finish. Recent efforts have been made at retaining the low fusion temperature of these glazes and enamels and the acid/alkali durability of the coating, but with the removal of the lead oxide.

LEAD-FREE GLAZE OR ENAMEL FOR USE ON CERAMIC BODIES

FIELD OF THE INVENTION

This invention relates to a lead-free glaze or enamel. More particularly, the invention concerns a lead-free glaze or enamel for use on ceramic bodies used to produce articles such as chinaware or dinnerware.

BACKGROUND OF THE INVENTION

Lead containing glazes and enamels for use on ceramic bodies are well-known in the ceramic art. Such glazes and enamels generally comprise a vehicle and one or more glass frits. A glaze is typically thought of as a clear coating, whereas an enamel is a glaze which contains a pigment or similar particles in suspension. Such glazes and enamels are applied to the surfaces of a green, partially, or fully fired ceramic body in the form of a paste. After application of the glaze or enamel to the surface of the ceramic body by silk screening or other conventional techniques, the coated ceramic body is fired to cure the ceramic body, bond the glaze or enamel to the surface of the ceramic body, and volatilize the vehicle.

In the past, the use of lead oxide in these compositions served to lower the fusing point of the frit and to render an acid/alkali resistant finish. Recent efforts have been made at retaining the low fusion temperature of these glazes and enamels and the acid/alkali durability of the coating, but with the removal of the lead oxide.

SUMMARY OF THE INVENTION

The present invention concerns a lead-free composition for use in forming a coating on ceramic bodies and a method of using the same. The lead-free composition comprises a hard glass frit, a flux frit, and a clay. A vehicle is generally included to facilitate the application of the composition.

The hard frit comprises by weight percent from about 45% to about 70% $SiO_2$, from about 4% to about 15% $B_2O_3$, from about 4% to about 17% $Al_2O_3$, from about 1% to about 9% $Na_2O$, from about 1% to about 9% $K_2O$, from about 0.2% to about 5% $Li_2O$, from about 0.4% to about 12% CaO, from about 0.1% to about 7% $ZrO_2$ up to about 3% ZnO, up to about 2% $WO_3$, up to about 2% $Bi_2O_3$, and up to about 2% $MoO_3$.

The flux frit comprises in weight percent from about 40% to about 52% $SiO_2$, from about 17% to about 26% $B_2)_3$, from about 2% to about 10% $Al_2O_3$, from about 6% to about 14% $Na_2O$, from about 0.5% to about 3% $K_2O$, up to about 3% MgO and from about 8% to about 17% CaO.

Various commercially available clays may be used in conjunction with the present invention. Preferably, the clay comprises from about 40% to about 55% $SiO_2$, from about 20% to about 45% $Al_2O_3$, up to about 5% $Na_2O$, up to about 5% $K_2O$, up to about 5% MgO and up to about 5% CaO.

The solids portion of the glaze or enamel comprises in weight percent from about 70% to about 95% hard frit, from about 2% to about 10% flux frit, and from about 4% to about 18% clay.

These and other aspects of the invention will become clear to those of ordinary skill in the art upon the reading and understanding of the specification.

DETAILED DESCRIPTION OF THE INVENTION

This invention concerns lead-free and cadmium-free glazes and glass enamels which possess excellent resistance to both alkali and acid environments and moderate firing or maturation temperatures. The glazes and enamels also display good gloss, and a coefficient of thermal expansion that is compatible with a china ceramic body.

As used in this specification and the claims below the terms "lead-free" and "cadmium-free" mean no intentional addition of cadmium or lead, and less than 0.005% by weight lead or cadmium, respectively.

The glazes and enamels of the present invention are especially adapted for use on green ceramic bodies such as those used to produce chinaware or dinnerware, or fine bone china. The glazes and enamels of the present invention are especially well suited for use on fine bone china. Bone china may be produced utilizing various compositions to form the ceramic body. However, bone china is a ceramic ware which is generally formed by firing a composition comprising about 47% calcined bone, about 27% china clay, and about 30% china stone. The maturation temperature of the glazes and enamels of the present invention are well below the temperature at which a china ceramic body thermally deforms. Specifically, the glazes and enamels of the present invention may be fired between about 1000° C. to about 1200° C. using conventional furnaces or kilns.

The glaze or enamel compositions of the present invention comprise a hard glass frit, a flux glass frit, and a clay. The glass frits of the present invention can be melted in conventional refractory crucibles at 1400°-1600° C. with little attack on the crucibles. The glass melt may be handled by any suitable conventional means though typically it is quenched by steel rolls into flake or frit, using techniques well-known to those skilled in the art.

The enamels and glazes of the present invention include a hard glass frit having the following compositions:

| Component | Range (Wt. %) | Preferred Range (Wt. %) | More Preferred Range (Wt. %) |
|---|---|---|---|
| $SiO_2$ | 45–70 | 50–65 | 52–63 |
| $B_2O_3$ | 4–15 | 5–14 | 6–13 |
| $Al_2O_3$ | 4–17 | 5–16 | 6–15 |
| $Na_2O$ | 1–9 | 1.5–8 | 2–7 |
| $K_2O$ | 1–9 | 1.5–8 | 1.75–7.5 |
| $Li_2O$ | .2–5 | .3–4 | .4–3.5 |
| CaO | 4–12 | 5–11 | 5.5–10 |
| $ZrO_2$ | .1–7 | .1–6.0 | .1–5.5 |

The hard glass frit contains some $ZrO_2$ to enhance alkali durability, but preferably the $ZrO_2$ level is not so high so as to induce crystallization, which manifests itself as a dull or foggy coating. To avoid undesirable color development, the hard glass frit preferably includes a maximum of 3% by weight ZnO, preferably a maximum of 2.5% by weight ZnO, and more preferably a maximum of 2% by weight ZnO.

To decrease the surface tension of the glaze or glass enamel, the hard glass frit contains a maximum of 2% by weight, and preferably a maximum of 1% by weight, of each of tungsten oxide ($WO_3$), bismuth oxide ($Bi_2O_3$), and molybdenum oxide ($MoO_3$). More preferably, the hard glass frit contains substantially no tungsten oxide, bismuth oxide, or molybdenum oxide.

The enamels and glazes of the present invention include a flux frit having the following compositions:

| Component | Range (Wt %) | Preferred Range (Wt %) |
|---|---|---|
| $SiO_2$ | 40–52 | 42–49 |
| $B_2O_3$ | 17–26 | 18–24 |
| $Al_2O_3$ | 2–10 | 3–9 |
| $Na_2O$ | 6–14 | 7–3 |
| $K_2O$ | .5–3 | .7–1.8 |
| $MgO$ | 0–3 | 0–2 |
| $CaO$ | 8–17 | 9–16 |

Any number of commercially available clays may be used to produce the enamels and glazes of the present invention. Such clays include the following compositions:

| Component | Range (Wt %) | Preferred Range (Wt %) |
|---|---|---|
| $SiO_2$ | 40–55 | 42–52 |
| $Al_2O_3$ | 20–45 | 32–42 |
| $Na_2O$ | 0–5 | 0–3 |
| $K_2O$ | 0–5 | 0–3 |
| $MgO$ | 0–5 | 0–3 |
| $CaO$ | 0–5 | 0–3 |

The portions of hard frit, flux frit, and clay utilized in enamels or glazes of the present invention are as follows:

| Component | Range (Wt %) | Preferred Range (Wt %) |
|---|---|---|
| Hard frit | 70–95 | 75–90 |
| Flux frit | 2–10 | 3–8 |
| Clay | 4–18 | 5–15 |

The hard frit, flux frit, and clay define or form the "solids portion" of the glaze or enamel. In addition to the "solids portion," it would be appreciated that the glaze or enamel may include other additives such as vehicles, flocculants, deflocculants, binders, wetting agents, antifoaming agents, dyes, and pigments.

The enamels or glazes are made according to the following technique. The glass frits (hard frit and flux frit), in flake or granular form, and clay are ball-milled with water to an average particle size of about 5 to about 6 microns as measured on a Microtrac at the 50% level. The resulting slip, which comprises generally about 35% water, is screen printed, hand printed, sprayed, brushed, or otherwise applied on the ceramic body by methods known in the art, and then fired using conventional firing techniques. Of course, it will be appreciated that the amount of water utilized in the slip can be varied to best accommodate the application technique being utilized. Also, instead of water, other conventional vehicles may be employed. Firing times greatly depend on such factors as the previous firing history of the ceramic body, furnace conditions, and the size of the charge or load placed in the furnace. However, generally, the coated ceramic bodies are fired for a period of 4 to 12 hours.

Subsequent to firing, the "solids portion" of the glaze or enamel yields a coating composition comprising by weight from about 50% to about 66% $SiO_2$, from about 6% to about 12% $B_2O_3$, from about 10% to about 15% $Al_2O_3$, from about 0.25% to about 2.5% $Li_2O$, from about 2.5% to about 7% $Na_2O$, from about 2.5% to about 6.5% $K_2O$, from about 7% to about 9% $CaO$, and up to 4% $ZrO_2$. As with the hard glass frit, preferably the coating includes some $ZrO_2$; and a maximum of 3% by weight ZnO, preferably a maximum of 2.5% by weight ZnO, and more preferably a maximum of 2% by weight ZnO. Similarly, the coating contains a maximum of 2% by weight, and preferably a maximum of 1% by weight of each of $WO_3$, $Bi_2O_3$, and $MoO_3$. More preferably, the coating contains substantially no $WO_3$, $Bi_2O_3$, and $MoO_3$.

The glazes and enamels of the present invention exhibit excellent alkaline durability. Alkaline durability may be determined in various manners. One known method is to immerse pieces of ceramic that have been coated and fired with the glaze or enamel in a heated, stirred, alkaline, dishwasher detergent solution (e.g., a group 4 detergent such as British Calgonite). The detergent solution is prepared by creating a 0.5% by weight concentration of Calgonite using deionized or distilled water. After the 32 hours of exposure, the samples are removed from the solution, dried, and then rubbed with a metal object such as a silver spoon. The following evaluation scale is utilized to evaluate the marked glass or enamel:

| Definition | Visual Appearance | Feel "Drag" of Spoon |
|---|---|---|
| No marking | No mark | No |
| Very slightly marked | Mark removed when rubbed with dry cloth | No |
| Slightly marked | Mark removed with rubbed with damp cloth | No |
| Marked | Mark remains when rubbed with damp cloth | No |
| Looks like a light pencil line on paper | Mark remains when rubbed with damp cloth | Yes |

Glazes or enamels made in accordance with the principles of the present invention exhibit "No marking" or a "Very slightly marked" condition after 32 hours of exposure to the detergent solution.

By way of illustration and not by any limitation, the following examples will describe specific compositions within the scope of the present invention. Unless otherwise indicated, all parts and percentages are by weight, and all temperatures are in degrees Centigrade (°C.).

EXAMPLE 1

A glaze composition is produced utilizing a hard glass frit indicated in Table I as Formulation A, a flux glass frit as indicated in Table II, and a clay as indicated in Table III. The glass frits and clay are prepared as a slip by ball milling the glass frits and clay in water until a particle size of about 3 microns to about 4 microns, as determined by a Microtrac at a 50% level, is achieved. The slip comprises about 35% water. The slip is then applied by spraying to 6″ conventional bone china bisque fired plates and then fired at 1100° C. using a conventional 8 hour glost kiln cycle.

EXAMPLE 2

A second glaze composition is prepared by using Formula B in Table I, the flux frit of Table II, and the clay of Table III, and by following the steps set forth in Example 1.

EXAMPLE 3

A third glaze composition is prepared by using Formula C in Table I, the flux frit of Table II, and the clay of Table III, and by following the steps set forth in Example 1.

EXAMPLE 4

A fourth glaze composition is prepared by using Formula D in Table I, the flux frit of Table II, and the clay of Table III, and by following the steps set forth in Example 1.

TABLE I

| Composition of Hard Frit - % by Weight | | | | |
| --- | --- | --- | --- | --- |
| Component | Formula A* | Formula B* | Formula C* | Formula D* |
| $SiO_2$ | 55.39 | 60.92 | 55.75 | 63.23 |
| $B_2O_3$ | 11.65 | 11.81 | 11.75 | 6.38 |
| $Al_2O_3$ | 12.30 | 7.97 | 12.42 | 12.11 |
| $Na_2O$ | 4.86 | 6.38 | 2.81 | 4.22 |
| $K_2O$ | 4.25 | 2.29 | 4.28 | 2.77 |
| $Li_2O$ | 2.46 | 1.42 | 2.48 | 2.73 |
| CaO | 7.68 | 7.85 | 7.74 | 7.21 |
| $ZrO_2$ | 1.09 | 1.10 | 2.44 | 0 |

*substantially no $ZnO$, $Bi_2O_3$, $WO_3$, $MoO_3$

TABLE II

| Composition of Flux Frit | |
| --- | --- |
| Component | % by Weight |
| $SiO_2$ | 46.42 |
| $B_2O_3$ | 21.49 |
| $Al_2O_3$ | 6.79 |
| $Na_2O$ | 10.44 |
| $K_2O$ | 1.12 |
| MgO | 0 |
| CaO | 13.64 |

TABLE III

| Composition of Clay | |
| --- | --- |
| Component | % by Weight |
| $SiO_2$ | 47.50 |
| $Al_2O_3$ | 37.0 |
| $Na_2O$ | .08 |
| $K_2O$ | 1.18 |
| MgO | .3 |
| CaO | .06 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A lead-free composition for use in forming a coating on ceramic bodies comprising a hard glass frit and a flux frit, said hard glass frit comprising by weight percent from about 45% to about 70% $SiO_2$, from about 4% to about 15% $B_2O_3$, from about 4% to about 17% $Al_2O_3$, from about 1% to about 9% $Na_2O$, from about 1% to about 9% $K_2O$, from about 0.2% to about 5% $Li_2O$, from about 0.4% to about 12% CaO, from about 0.1% to about 7% $ZrO_2$, up to about 3% ZnO, up to about 2% $WO_3$, up to about 2% $Bi_2O_3$, and up to about 2% $MoO_3$, said flux frit comprising in weight percent from about 40% to about 52% $SiO_2$, from about 17% to about 26% $B_2O_3$, from about 2% to about 10% $Al_2O_3$, from about 6% to about 14% $Na_2O$, from about 0.5% to about 3% $K_2O$, up to 3% MgO, and from about 8% to about 17% CaO.

2. A lead-free composition as set forth in claim 1 wherein, said flux frit comprises in weight percent from about 42% to about 49% $SiO_2$, from about 18% to about 24% $B_2O_3$, from about 3% to about 9% $Al_2O_3$, from about 7% to about 13% $Na_2O$, from about 0.7% to about 1.8% $K_2O$, up to 2% MgO, and from about 9% to about 16% CaO.

3. A lead-free composition as set forth in claim 1 including a clay, said clay comprising in weight percent from about 40% to about 55% $SiO_2$, from about 20% to about 45% $Al_2O_3$, up to 5% each of $Na_2O$, $K_2O$, MgO and CaO.

4. A lead-free composition as set forth in claim 1 including a clay, said clay comprising in weight percent from about 42% to about 52% $SiO_2$, from about 32% to about 42% $Al_2O_3$, and up to about 3% each of $Na_2O$, $K_2O$, MgO and CaO.

5. A lead-free composition as set forth in claim 3 wherein said composition includes a solids portion, said solids portion comprising in weight percent from about 70% to about 95% said hard frit, from about 2% to about 10% said flux frit, and from about 4% to about 18% said clay.

6. A lead-free composition as set forth in claim 3 wherein said composition includes a solids portion, said solids portion comprising in weight percent from about 75% to about 90% said hard frit, from about 3% to about 8% said flux frit, and from about 5% to about 15% said clay.

7. A lead-free composition as set forth in claim 1 wherein said hard glass frit comprises in weight percent from about 50% to about 65% weight percent $SiO_2$, from about 5% to about 14% $B_2O_3$, from about 5% to about 16% $Al_2O_3$, from about 1.5% to about 8% $Na_2O$, from about 1.5% to about 8% $K_2O$, from about 0.2% to about 5% $Li_2O$, from about 4% to about 12% CaO, from about 0.1% to about 6% $ZrO_2$, up to about 2.5% ZnO, up to about 1% $WO_3$, and up to about 1% $MoO_3$.

8. A lead-free composition as set forth in claim 1 wherein said hard glass frit comprises in weight percent up to about 2.0% ZnO, substantially no $WO_3$, and substantially no $MoO_3$.

9. A lead-free composition as set forth in claim 1 wherein said hard glass frit comprises in weight percent from about 52% to about 63% $SiO_2$, from about 6% to about 13% $B_2O_3$, from about 6% to about 15% $Al_2O_3$, from about 2% to about 7% $Na_2O$, from about 1.75% to about 7.5% $K_2O$, from about 0.4% to about 3.5% $Li_2O$, from about 5.5% to about 10% CaO, from about 1% to about 5.5% $ZrO_2$, up to about 2.0% ZnO, substantially no $WO_3$, and substantially no $MoO_3$.

10. A lead-free composition for use in forming a coating on ceramic bodies comprising a hard glass frit and a flux frit, said hard glass frit consisting essentially of by weight percent from about 45% to about 70% $SiO_2$, from about 4% to about 15% $B_2O_3$, from about 4% to about 17% $Al_2O_3$, from about 1% to about 9% $Na_2O$, from about 1% to about 9% $K_2O$, from about 0.2% to about 5% $Li_2O$, from about 0.4% to 12% CaO, from about 0.1% to about 7% $ZrO_2$, up to about 3% ZnO, up to about 2% $WO_3$, substantially no $Bi_2O_3$, and up to about 2% $MoO_3$, said flux frit comprising in weight percent from about 40% to about 52% $SiO_2$, from about 17% to about 26% $B_2O_3$, from about 2% to about 10% $Al_2O_3$, from about 6% to about 14% $Na_2O$, from about 0.5% to about 3% K$_2$O, up to 3% MgO, and from about 8% to about 17% CaO.

11. A lead-free composition as set forth in claim 10 wherein, said flux frit comprises in weight percent from about 42% to about 49% SiO$_2$, from about 18% to about 24% B$_2$O$_3$, from about 3% to about 9% Al$_2$O$_3$, from about 7% to about 13% Na$_2$O, from about 0.7% to about 1.8% K$_2$O, up to 2% MgO, and from about 9% to about 16% CaO.

12. A lead-free composition as set forth in claim 10 including a clay, said clay comprising in weight percent from about 40% to about 55% SiO$_2$, from about 20% to about 45% Al$_2$O$_3$, and up to 5% each of Na$_2$O, K$_2$O, MgO and CaO.

13. A lead-free composition as set forth in claim 10 including a clay, said clay comprising in weight percent from about 42% to about 52% SiO$_2$, from about 32% to about 42% Al$_2$O$_3$, and up to about 3% each of Na$_2$O, K$_2$O, MgO and CaO.

14. A lead-free composition as set forth in claim 12 wherein said composition includes a solids portion, said solids portion comprising in weight percent from about 70% to about 95% said hard frit, from about 2% to about 10% said flux frit, and from about 4% to about 18% said clay.

15. A lead-free composition as set forth in claim 12 wherein said composition includes a solids portion, said solids portion comprising in weight percent from about 75% to about 90% said hard frit, from about 3% to about 8% said flux frit, and from about 5% to about 15% said clay.

16. A lead-free composition as set forth in claim 10 wherein said hard glass frit consists essentially of in weight percent from about 50% to about 65% weight percent SiO$_2$, from about 5% to about 14% B$_2$O$_3$, from about 5% to about 16% Al$_2$O$_3$, from about 1.5% to about 8% Na$_2$O, from about 1.5% to about 8% K$_2$O, from about 0.2% to about 5% Li$_2$O from about 4% to about 12% CaO, from about 0.1% to about 6% ZrO$_2$, up to about 2.5% ZnO, up to about 1% WO$_3$, and up to about 1% MoO$_3$.

17. A lead-free composition as set forth in claim 10 wherein said hard glass frit includes in weight percent up to about 2.0% ZnO substantially no WO$_3$, and substantially no MoO$_3$.

18. A lead-free composition as set forth in claim 10 wherein said hard glass frit consists essentially of in weight percent from about 52% to about 63% SiO$_2$, from about 6% to about 13% B$_2$O$_3$, from about 6% to about 15% Al$_2$O$_3$, from about 2% to about 7% Na$_2$O, from about 1.75% to about 7.5% K$_2$O, from about 0.4% to about 3.5% Li$_2$O, from about 5.5% to about 10% CaO, from about 1% to about 5.5% ZrO$_2$, up to about 2.0% ZnO, substantially no WO$_3$, and substantially no MoO$_3$.

* * * * *